(12) United States Patent
Dean

(10) Patent No.: US 6,846,429 B2
(45) Date of Patent: Jan. 25, 2005

(54) TRANSPARENT PARAMAGNETIC POLYMER

(75) Inventor: David M. Dean, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 78 days.

(21) Appl. No.: 10/050,281

(22) Filed: Jan. 16, 2002

(65) Prior Publication Data

US 2003/0069376 A1 Apr. 10, 2003

Related U.S. Application Data

(60) Provisional application No. 60/261,965, filed on Jan. 16, 2001.

(51) Int. Cl.[7] .............................. H01F 10/10; C08J 5/09
(52) U.S. Cl. ................. 252/62.57; 528/271; 528/295.5; 528/290; 528/299; 528/302; 525/418; 525/535; 525/191; 525/199; 525/201; 525/212; 525/221; 525/223; 525/227; 524/779
(58) Field of Search .............................. 528/271, 295.5, 528/290, 299, 302; 525/418, 535, 191, 199, 201, 212, 221, 223, 227; 252/62.57; 524/779

(56) References Cited

U.S. PATENT DOCUMENTS

| | | |
|---|---|---|
| 3,982,554 A | 9/1976 | Saito et al. |
| 4,554,088 A | 11/1985 | Whitehead et al. |
| 4,628,037 A | 12/1986 | Chagnon et al. |
| 4,935,147 A | 6/1990 | Ullman et al. |
| 4,941,969 A | 7/1990 | Schonert et al. |
| 4,946,236 A | 8/1990 | Dautartas et al. |
| 5,279,936 A | 1/1994 | Vorpahl |
| 5,283,079 A | 2/1994 | Wang et al. |
| 5,442,021 A | 8/1995 | Heiliger |
| 5,536,644 A | 7/1996 | Ullman et al. |
| 5,559,909 A | 9/1996 | Anderson et al. |
| 5,560,970 A | 10/1996 | Ludebuhl |
| 5,744,367 A | 4/1998 | Talley et al. |
| 5,798,083 A | 8/1998 | Massey et al. |
| 5,864,643 A | 1/1999 | Pan |
| 5,935,866 A | 8/1999 | Chagnon et al. |
| 5,986,550 A | 11/1999 | Rapaport et al. |
| 6,002,819 A | 12/1999 | Saito et al. |
| 6,013,531 A | 1/2000 | Wang et al. |
| 6,094,293 A | 7/2000 | Yokoyama et al. |
| 6,102,582 A | 8/2000 | Espindola et al. |
| 6,106,089 A | 8/2000 | Wen et al. |
| 6,133,043 A | 10/2000 | Talley et al. |
| 6,137,608 A | 10/2000 | White |
| 6,141,465 A | 10/2000 | Bischel et al. |

FOREIGN PATENT DOCUMENTS

| | | |
|---|---|---|
| EP | 0404941 A1 | 1/1991 |
| EP | 0612772 A1 | 8/1994 |
| EP | 0688849 A2 | 12/1995 |
| JP | 06122803 | 5/1994 |
| JP | 08073735 A | 3/1996 |
| JP | 09290163 A | 11/1997 |

OTHER PUBLICATIONS

Robert C. Weast, Ph.D., Editor-in-Chief, CRC Handbook of Chemistry and Physics, 1985–1986, pp. E–116–E–121, 66th Edition, CRC Press, Inc., Boca Raton, Florida.

(List continued on next page.)

*Primary Examiner*—Samuel A. Acquah

(57) ABSTRACT

This invention provides a transparent, paramagnetic polymer composition in which a polymer is completed with sufficient rare earth ions, particularly ions selected from ions in the group of elements 64–69, to provide a polymer with a magnetic mass susceptibility greater than $20 \times 10^{-6}$ emu/g measured at 298° K.

This invention provides optically responsive devices that employ these transparent, paramagnetic polymers as an element that is responsive to a magnetic field and a means for providing magnetic field.

This invention provides transparent labels or markings employing these transparent, paramagnetic polymers.

18 Claims, 5 Drawing Sheets

OTHER PUBLICATIONS

Padmavathy Rajagopalan, et al, Synthesis and Near Infrared Properties of Rare Earth Ionomers, Journal of Polymer Science: Part B: Polymer Physics, (1996), pp. 151–161, vol. 34.

Yoshiyuki Okamoto, Synthesis, Characterization, and Applications of Polymers Containing Lanthanide Metals, J. Macromol. Sci.–Chem., (1987), pp. 455–477, A24(3&4).

Naoki Yoshioka, et al., Complexation of Gadolinium Ion with Poly(methacrylic acid)s and Magnetic Properties of the Complexes, Inorganica Chimica Acta., 1987, 135–138, 128.

Isao Nagata, et al., Investigation on Ion Binding in Synthetic Polyelectrolyte Solutions Using Rare Earth Metal Fluorescence Probes, Macromolecules, 1983, 749–753, 16.

Partial International Search report for International Application No. PCT/US02/04542.

International Search report for International Application No. PCT/US02/04542.

TRANSPARENT PARAMAGNETIC POLYMER

This application claims the benefit of U.S. Provisional Application No. 60/261,965, filed Jan. 16, 2001, which is incorporated by reference herein for all purposes as if fully set forth.

FIELD OF THE INVENTION

This invention relates to transparent, paramagnetic polymer compositions having rare earth ions complexed with the polymer. This invention particularly relates to transparent, paramagnetic polymer compositions comprising non-ethylene-containing polymer and rare earth ions. This invention also relates to optical fibers or waveguides that comprise transparent, paramagnetic polymer that has a magnetic mass susceptibility greater than $20 \times 10^{-6}$ electromagnetic units per gram (emu/g) measured at 298° K. This invention further relates to optical switches that contain an element that is comprised of a transparent, paramagnetic polymer having a magnetic mass susceptibility greater than $20 \times 10^{-6}$ emu/g measured at 298° K. This invention further relates to use of a transparent, paramagnetic polymer for transparent marking, labeling or identification purposes.

BACKGROUND OF THE INVENTION

Polymer Compositions

It is known that certain rare earth elements have a strong paramagnetic response. This paramagnetic behavior arises from a large number of unpaired electrons in the element's 4 f-electron shell. Because the effect is related to the arrangement of 4 f electrons, which are largely unaffected by neighboring elements within a rare earth compound, the general trend across this series of elements can be seen by looking at either the oxides or sulfides of the series. Both the oxides and sulfides in this series involve rare earth cations in the +3 oxidation state.

Based on the data in Table 1 below, taken from *CRC Handbook of Chemistry and Physics*, 66th ed., p. E116, the strongest paramagnetic effect, as defined by the magnetic mass susceptibilities of the elemental compounds, can be seen as confined to elements 64 to 69 (Gadolinium, Terbium, Dysprosium, Holmium, Erbium, and Thulium).

TABLE 1

MAGNETIC MASS SUSCEPTIBILITIES

| Element Number | Elemental Oxide or Sulfide | Magnetic Mass Susceptibility (emu/g) |
|---|---|---|
| 63 | Europium Oxide | $10,100 \times 10^{-6}$ @ 298° K. |
| 64 | Gadolinium Oxide | $53,200 \times 10^{-6}$ @ 293° K. |
| 65 | Terbium Oxide | $78,340 \times 10^{-6}$ @ 288° K. |
| 66 | Dysprosium Oxide | $89,600 \times 10^{-6}$ @ 287° K. |
| 67 | Holmium Oxide | $88,100 \times 10^{-6}$ @ 293° K. |
| 68 | Erbium Oxide | $73,920 \times 10^{-6}$ @ 286° K. |
| 69 | Thulium Oxide | $51,444 \times 10^{-6}$ @ 296° K. |
| 70 | Ytterbium Sulfide | $18,300 \times 10^{-6}$ @ 292° K. |

Merely blending rare earth oxide or sulfide particles within a polymer matrix would produce a filled polymer material that possessed a paramagnetic response. However, since the particles are larger than most wavelengths of light, the filled system would scatter incident waves of light resulting in a material that is not transparent.

Rajagopalan, Tsatsas and Risen, Jr. have prepared ionomers of ethylene acrylic acid (EAA) copolymer and ethylene methacrylic acid (EMA) copolymer, in which the copolymers were neutralized with $Dy^{+3}$, $Er^{+3}$, $Sm^{+3}$, $Tb^{+3}$, $Tm^{+3}$, and $Yb^{+3}$, and mixtures thereof. See Rajagopalan, et. al, "Synthesis and Near Infrared Properties of Rare Earth Ionomer", *Journal of Polymer Science: Part B: Polymer Physics*, vol. 34, 151–161 (1996). They report that these ionomers have valuable optical properties and they exhibit strong Raman scattering and luminescence in the near IR region, which is where most optical communication occurs. Paramagnetic response of such compositions was not considered or even noted.

Polymers containing lanthanide metal ions, specifically $Eu^{3+}$ and $Tb^{3+}$ salts are disclosed in Y. Okamoto, "Synthesis, Characterization, and Application of Polymers Containing Lanthanide Metals", *J. Macromol. Sci.-Chem.*, A24(3&4), pp. 455–477 (1987). The polymers used include poly(acrylic acid), poly(methacrylic acid), partially sulfonated or carboxylated styrene, styrene-acrylic acid copolymers and methyl methacrylate-methacrylic acid copolymers. The fluorescent intensity of these polymers was studied. The polymers made appear to contain up to 8 wt. % $Tb^{3+}$ and up to 10–11 wt. % $Eu^{3+}$, though the fluorescence intensity for the $Eu^{3+}$-polymer salts reached a maximum at 4–5 wt. % $Eu^{3+}$ content.

It would be useful to obtain a transparent polymer that exhibits a paramagnetic response. Such a polymer would be extremely useful in optical fiber communication systems (e.g., as an optical switch), in transparent markers or labels, or in a number of other potential uses (e.g., for use in separations and assays of bio-active materials, though transparency may not be necessary in such uses, and for living hinges).

Uses of Polymer Compositions

Optical Switches

In recent years the proliferation of data communications has placed a significantly increased demand on transmission bandwidths. Optical systems have a much larger bandwidth than electric (metal conductor) transmission systems, and with it the ability to transmit a much greater volume of data through a single transmission line. Optical fibers are therefore the most promising systems for achieving high data rate telecommunications.

Optical fibers are well known for the transmission of light along a length of filament by multiple internal reflections of light. Great care is taken to minimize light losses due to absorption and scattering along the length of filament, so that light applied to one end of the optical filamentary material is efficiently transmitted to the opposite end of the material. An optical fiber is in essence a small diameter waveguide comprising a light transmission portion or core of optical filamentary material, surrounded by cladding having an index of refraction lower than that of the core, so as to achieve total internal reflection along the length of the filament. Optical fibers are known to be made from both organic and inorganic glasses, the glass core surrounded by a thermoplastic or thermosetting polymer, or wholly thermoplastic polymers, that has an index of refraction less than that of the fiber core.

Connectors are important components in optical fiber communication systems. With the increasing use of optical fibers and associated optoelectronic devices such as lasers, light-emitting diodes (LEDs), photodetectors and planar waveguide devices, there is an increasing need for reliable optical connectors, optical switches and aligners.

Switches in optical fiber communication systems are used to change the optical path, e.g., to select transmission lines. In switches and other connectors, the precise alignment of optical paths, either permanently or reconfigurably, between two mating devices is essential for maximum optical coupling efficiency. For example, in the interconnection of a single mode optical fiber, the alignment tolerance must be on the order of a few micrometers or less. There is also a need for devices that can introduce precise, controllable, misalignment of optical paths. Such devices can be used to attenuate lightwave signals. Variable optical attenuators are increasingly important in dense wavelength-division multiplexing (DWDM) optical fiber transmission systems. Variable attenuators are used to vary the amount of loss light experiences as it passes through the device. A variable attenuator based on coupling loss is typically composed of two fibers whose separation is mechanically controlled. As the separation between fibers increases, the amount of loss also increases. Variable attenuators based on polarization loss are composed of GRIN lenses to collimate light from the fiber, a plate or cell to rotate the polarization of the light, and a polarizer to introduce the loss. In-line variable optical attenuators using magnetically controlled displacement are disclosed in U.S. Pat. No. 6,102,582 (Espindola et al.). It would be desirable to obtain the alignment of optical devices swiftly, accurately without physical/mechanical contact needed to move fibers and the like, and to allow for alignment in multiple directions.

Another drawback of optical signals and optical systems is that they do not have the flexibility of electrical signals in regard to their ability to multiplex with other optical signals. Even in optical transmission systems, information signals are generally converted from the optical domain to the electrical domain at the input side of the switching systems, so that signals may be separated and recombined as desired. Then the electrical signals are converted back to the optical domain on the outgoing side of the switching system. This multiplexing and de-multiplexing, therefore, has traditionally been performed using electrical components.

Optical switches and their use are generally known in the industry to those skilled in the art and U.S. Pat. Nos. 5,559,909, 6,102,582, 6,137,608, 6,094,293, 5864643, 6,002,819, 4,946,236 are included by reference in their entirety for further general guidance for those skilled in the art. There is a need not taught or suggested in these references, however, for optically responsive devices that employ transparent, paramagnetic elements.

Labels

There is a well-recognized need for marking, labeling and identification purposes, such as those used for product identification, product tracking and anti-theft applications. Such labeling generally is readily detectable by visual means. Bar codes such as are conventionally used in many commercial applications today would be an example of such visible labels.

Some labels are detectable by means other than visual ones. For example, use of magnetically responsive marking technology is generally known in the marking industry. Such magnetically responsive marking is disclosed in U.S. Pat. Nos. 5,560,970, 6,106,089, 5,986,550, which are included in their entirety for further illustration and guidance for those skilled in the art. But, these magnetically responsive markings are still visible and can be obtrusive. Thus, there is a need for markings that are also transparent, that is not readily visible to persons.

BRIEF DESCRIPTION OF THE DRAWINGS

FIGS. 3 and 5A correspond to each other and show the light being bent as it passes through the disk. FIGS. 4 and 5B correspond to each other and show the disk moved by magnetic field out of the light path.

SUMMARY OF THE INVENTION

Figure 1A:
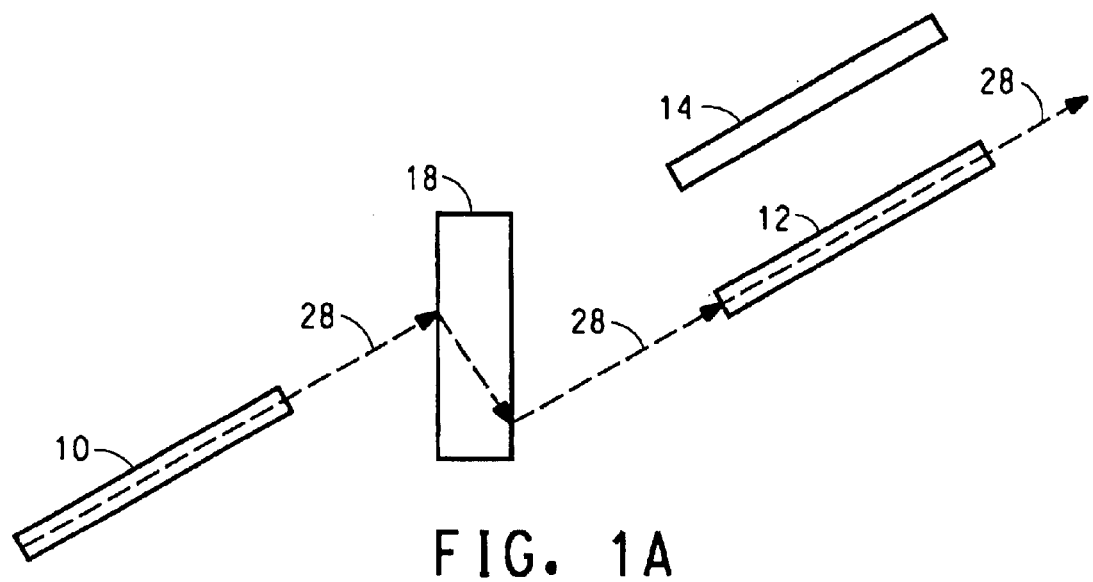
FIGS. 1A and 1B provide schematic views of an optical switch employing a transparent, paramagnetic polymer article that respectively show the article moved into and out of path of light by a magnetic field.

This invention provides a transparent, paramagnetic polymer composition comprising a polymer complexed with one or more rare earth ions, particularly one comprising a non-ethylene containing polymer complexed with one or more rare earth ions selected from the group consisting of elements 64–69. Preferably, This polymer is complexed with a sufficient amount of one or more rare earth ions to provide a polymer composition magnetic mass susceptibility of greater than $20 \times 10^{-6}$ (preferably greater than $25 \times 10^{-6}$) emu/g measured at 298° K. Preferably, the amount of rare earth ions, other than for elements 66 and 67 (dysprosium and holmium), is greater than about 9 wt. % based on the total weight of the polymer composition. Particularly preferred rare earth ions are dysprosium and holmium, which are preferably present in an amount that is at least 5 wt. % based on the total weight of the polymer composition.

The invention provides an optically responsive element or device capable of altering incident light characterized in that it comprises one or more transparent, paramagnetic elements that are responsive to a magnetic field and a means for providing the magnetic field. The one or more transparent, paramagnetic elements comprise in whole or part a transparent, paramagnetic polymer composition comprising a polymer complexed with a sufficient amount of one or more rare earth ions selected from the group consisting of elements 64–69 to provide a polymer composition magnetic mass susceptibility of greater than $20 \times 10^{-6}$ (preferably greater than $25 \times 10^{-6}$) emu/g measured at 298° K. A preferred optically responsive element is an optical switch for use in optical fiber communication systems comprising:

(a) a solid article capable of moving into and out of a path of incident light such that the when the solid article is moved into the initial path of incident light, the incident light passing through the solid article is redirected to a different path; and (b) a source of magnetic field to move the solid article into and out of the path of incident light;

wherein the solid article comprises one or more transparent, paramagnetic elements as described above.

Another preferred optically responsive element is an optical switch for use in optical fiber communication systems comprising:

(a) an input optical fiber for transmitting an incoming light signal wherein the optical fiber comprises the composition of one or more transparent, paramagnetic polymers (preferably selected from those discussed above) that have a magnetic mass susceptibility of greater than $20\times10^{-6}$ (preferably greater than $25\times10^{-6}$) emu/g measured at 298° K;

(b) one or more output optical fibers; and (c) one or more sources of magnetic field to move the first optical fiber, preferably in response to a predetermined signal, to align with one of the output optical fibers.

The invention provides a transparent, paramagnetic label for an article, the label being free of optical detection by a person with 20/20 vision from a distance of 3 feet or more. The label transparency preferably is such that it is possible to transmit at least 55% of the incident light/radiation through a 1/8 inch thick test piece of the label material for greater than 50% of the wavelengths in the range of 400 to 1800 nanometers (nm). The transparent, paramagnetic label comprising a composition comprising polymer complexed with one or more rare earth ions selected from the group consisting of elements 64–69 based on the total weight of the composition. The labeled article can be made by bonding transparent, paramagnetic polymer in the form of a film, particle, fiber, or ink to the article. Preferably it is made by the steps of (a) applying a label composition comprising a polymerization initiator and a monomer composition comprising polymerizable monomers particularly acrylic monomers and source of one or more rare earth ions selected from the group consisting of elements 64–69 to the article; and then (b) curing the label composition to form a transparent, paramagnetic polymer label.

DETAILED DESCRIPTION OF THE INVENTION

Definitions

By "copolymer," it is meant a polymer polymerized from two or more monomers, and includes terpolymers. The more specific description 'ethylene methacrylic acid copolymer', and the like, is also meant to include copolymers which may have a third monomer present.

The term "halo or halide" refers to fluoro, chloro, bromo, or iodo or the corresponding halides.

By "ionic domain size" is meant regions in a polymer composition that primarily comprise aggregated rare earth ions, typically identified by means of x-ray scattering studies which reveal electron density differences in such regions compared to the remainder of the composition. Such regions usually have an electron density that is higher than the remainder of the polymer due to increased concentration of electrons.

In referring to a composition or article as "transparent," it is meant that it is possible to transmit at least 55%, preferably 65%, more preferably 75%, of the incident light/radiation through a 1/8 inch thick piece of the composition or article material for greater than 50% of the wavelengths in the range of 400 to 1800 nm. The test for transparency follows the steps outlined in ASTM Standard D1746-97, "Standard Test Method for Transparency of Plastic Sheeting." The preferred wavelength(s) of the source of incident light/radiation, to ensure transparency for compositions disclosed herein, will typically vary with the composition. However, for most applications, the source of incident light/radiation is preferably a laser operating at one of the following wavelengths: 1550 nm, 1500 nm, 1300 nm, 900 nm, 650 nm and 570 nm, most preferably 1550 nm for telecommunication applications. The light/radiation source may also operate at a plurality of wavelengths. If so, a wavelength-tunable filter is preferred for such a source. The light/radiation source may also provide at least a portion of the wavelengths in the range of 400–4000 nm in combination with a wavelength-tunable filter. Radiation sources and wavelength-tunable filters are generally known to those skilled in the art. For guidance and information, see U.S. Pat. No. 6,141,465, incorporated by reference herein.

In referring to a composition or article as "paramagnetic," it is meant that the composition or article is responsive to a magnetic field, i.e., having a positive susceptibility to a magnetic field. Magnetic susceptibility may be measured by determining the force on a sample that is placed in an inhomogeneous magnetic field of known magnitude and gradient, or alternatively, for a more accurate measurement, the magnetic susceptibility may be measured using a superconducting quantum interference device (SQUID) which measures the magnetic moment of a sample by registering the induced electrical current as the sample is moved through a superconducting coil within a magnetic field. These devices are well known to those versed in the art.

Composition

The invention herein provides a transparent, paramagnetic composition comprising a polymer having complexed with it a sufficient amount of one or more rare earth cations to provide a polymer magnetic mass susceptibility of greater than $20\times10^{-6}$ emu/g measured at 298° K.

Suitable rare earth elements include gadolinium, terbium, dysprosium, holmium, erbium and thulium, element numbers 64–69. The preferred rare earth elements for use in the invention herein are element numbers 65–68; more preferably element numbers 66–67; most preferably, 66.

The presence of the rare earth elements in the composition imparts the paramagnetic property. As such, the more rare earth element that can be incorporated into a specific polymer, the stronger the possible paramagnetic response. The amount of the rare earth elements complexed with the polymer preferably is sufficient to obtain a magnetic mass susceptibility of the resulting polymer composition greater than about $20\times10^{-6}$ emu/g measured at 298° K, more preferably greater than about $25\times10^{-6}$ emu/g measured at 298° K, more preferably greater than about $35\times10^{-6}$ emu/g measured at 298° K, more preferably greater than about $50\times10^{-6}$ emu/g measured at 298° K. The rare earth ions are present preferably in an amount of greater than about 9 wt. %, preferably greater than about 10 wt. %, based on the total weight of the polymer composition. For compositions comprising dysprosium or holmium ions, however, lower amounts than with other elements in the series are effective. Thus, when elements 66 or 67 are used, they will preferably be present in an amount of at least about 5 wt. % based on the total weight of the polymer composition.

Suitable rare earth compounds include oxides, acetates, carbonates, acetyl acetonates and chlorides, preferably acetates or acetyl acetonates. One or more rare earth elements can be used to form the rare earth compound, preferably a salt. The ionic domain size of the aggregated rare earth ions is preferably in the range of less than 10% of the length of the wavelength of light that is being transmitted through the polymer, typically less than about 100 nm.

The rare earth elements are preferably added as salts, preferably finely divided salts, during polymerization of acrylic compositions. Preferably, the transparent, paramagnetic composition is made by complexing a finely-divided source of rare earth cations with a polymer having monomer that contains acid functionality, the acid functionality level preferably being sufficiently high to complex essentially all of the rare earth cations. To make fluoropolymer-based compositions of the invention, however, a fluoropolymer with sulfonic or carboxylic acid functionality is first preferred followed by a solvent exchange reaction to incorporate the rare earth compound as a rare earth salt or similar.

Preferred transparent, paramagnetic polymer compositions of the invention herein comprise non-ethylene-containing polymers complexed with the rare earth ions.

The polymer may be a homopolymer or copolymer, but preferably is a copolymer. Suitable monomers to form a copolymer include at least one of (meth)acrylates and/or (meth)acrylic acids. Fluoro and chloro acrylic polymers are also suitable. Suitable (meth)acrylate monomers may include acrylic esters (e.g., methyl acrylate, ethyl acrylate, propyl acrylate and butyl acrylate), methacrylic esters (e.g., cyclohexyl methacrylate, benzyl methacrylate, methyl methacrylate, ethyl methacrylate, propyl methacrylate and butyl methacrylate), styrene and methylene butyrol lactone (MBL), preferably methacrylic esters, most preferably methyl methacrylate. The preferred acid monomer is acrylic acid. Preferably, monomers with nitrogen-containing groups are not included in the composition claimed herein.

The polymer may also be formed from partially or completely deuterated vinyl monomers, which is especially useful for optical fibers. Resulting fibers, like their non-deuterated counterparts, are optically transparent, the wavelengths at which minimum attenuation of transmitted light occurs being shifted. A particularly useful deuterated monomer is methyl methacrylate $-d_8$. Lowest attenuation of light at the wavelengths of maximum transmission is attained as the amount of C—H bonds (as distinct from C—D bonds) in the core polymer of a fiber is minimized.

Suitable polymers also comprise fluoropolymers containing sulfonic or carboxylic acid functionality that are neutralized with rare earth ions. The process to make fluoropolymer-based compositions of the invention herein would involve a first step of preparing the fluoropolymer with sulfonic or carboxylic acid functionality and a second step that would involve a solvent exchange reaction to incorporate the rare earth compound as a rare earth salt or similar.

For acrylic polymers, the transparent, paramagnetic polymer composition is preferably formed from a monomer composition made by mixing the rare earth compound(s) and the selected monomers at a temperature of between 10° C. and the boiling point of said mixture, preferably at about 30° C. to about 80° C., until a clear solution is formed. In addition, short chain fatty acids of the general formula $R_1COOH$, where $R_1$ is $C_5$–$C_{30}$, can be added to the monomer composition before polymerization. Addition of short chain fatty acids to the composition leads to an improvement in the toughness of the final material, especially for compositions containing high levels of rare earth ion. The method of addition and order thereof are not limited.

The reaction mixture is initially a heterogeneous suspended system, but as the reaction proceeds the rare earth ions dissolve and a clear reaction solution can be obtained. By-products, such as water, acetic acid and acetyl acetone are formed by reaction, depending on the reactants used, and are generally dissolved in the monomer composition. These by-products need not necessarily be removed prior to polymerization. However, by-products can cause bubbles in the polymer, opacity and reduction of solvent resistance and the like, so they may be removed by azeotropic distillation and the like, after synthesis of the monomer composition when the occasion demands, especially when the highest possible transparency is desired. In order to inhibit the polymerization during preparation of the monomer composition, it is generally preferable to use the least necessary amount (preferably less than 300 parts per million) of conventional polymerization inhibitor such as hydroquinone, monomethylether, 2,4-dimethyl-6-tert-butyl phenol, etc.

Alternatively, transparency can be improved by the removal of by-products such as, but not limited to, water, acetic acid, and acetyl acetone after polymerization (a first processing step) in a second purifying processing step. An example of a second purifying step would be to subject the polymerized composition to a temperature greater than the boiling point of the species being removed. Furthermore, application of pressure during this second processing step may accelerate removal of the unwanted by-product(s).

The transparent, paramagnetic polymer in accordance with the present invention can be prepared by polymerizing the monomer composition in the presence of a radical polymerization initiator in a mold, an extruder, or directly on an article. The reaction can utilize initiators that are either activated thermally or through exposure to radiation such as ultraviolet light (UV). Thermally initiated polymerization reaction is effected at a temperature usually between –10° C. and 150° C. and preferably, about 40° c. to about 130° C. The initiator for radical polymerization is used usually in an amount of about 0.001 to 5% and preferably, 0.02% to 1.0% by weight of the total monomer used. Typical examples of thermal initiator include lauroyl peroxide, tert-butyl peroxyisopropyl carbonate, benzoyl peroxide, dicumyl peroxide, tert-butyl peroxyacetate, tert-butyl peroxybenzoate, di-tert-butyl peroxide, 2,2'-azo-bis-isobutylnitrile, and the like. Typical classes of chemical compounds that are useful as UV initiators for initiating the free radical polymerization of the disclosed compositions are alpha-hydroxyketones and alpha-amino-ketones.

Production of Fibers

Additionally, when the polymer composition will be used to make fibers, the reaction mix should preferably contain chain transfer agent(s). Such agents include those described in U.S. Pat. No. 4,161,500, col. 4, line 51, incorporated by reference herein. Both mono- and multifunctional chain transfer agents can be used. Typical examples include n-butyl mercaptan, lauryl mercaptan, mercapto-acetic acid, 2,2'-dimercaptodiethyl ether, ethylene bis(2-mercaptoacetate) commonly referred to as glycol dimercaptoacetate (GDMA), ethylene bis(3-mercapto-propionate), 1,1,1,-trimethylolethance tris(3-mercaptopropionate, pentaerythritol tetrakis (3-mercaptoprepionate). For reasons not entirely understood, the preferred chain transfer agents are those having mercaptan groups on carbon atoms adjacent to the carbonyl of a carboxylic functional group (i.e., of the type disclosed in U.S. Pat. No. 3,154,600, incorporated herein by reference) and having mercaptan difunctionality, because their use generally provides polymer of higher conversion and optical fiber having higher light transmission when compared to those prepared with other chain transfer agents. It is preferred to purify the chain transfer agent, which can be done by distillation.

It is also preferred to add styrene, ethyl acrylate or butyl acrylate to prohibit chain unzipping during polymer processing. These components are also mentioned as possible comonomers for the acrylate compositions discussed above.

Other copolymerizable monomers, crosslinking agents, coloring agents such as dyes and pigments, antistatic agents, flame retardants, etc. may be added to the composition when they are subjected to polymerization to such extent as to give no adverse results to the beneficial effects of the present invention.

In particular, for making optical fibers, the acrylate composition is preferred. A preferred method for synthesis of an acrylate preform for extrusion into an optical fiber is described in U.S. Pat. No. 4,161,500, incorporated by reference herein. Polymerization is carried out with the use of a soluble free radical polymerization initiator. It will be clear to one skilled in the art that many combinations of initiator, initiator concentration and polymerization temperature can be used. Combinations of initiators having different half-lives can also be used. The initiator and its concentration are so chosen that some will remain for the later heating stages of the polymerization step. A high purity initiator should be used so as to introduce the least possible amount of impurity into the resulting polymer.

It has also been found important to minimize the amount of foreign particles in the core polymer, because they absorb or scatter light and thus increase the attenuation of transmitted light in the fiber. The process of the present invention is therefore designed to meet this goal. Transfers of the various substances are preferably carried out to the extent possible in a sealed or closed system so that recontamination of purified materials by dust, dirt or particulate matter of any kind does not occur. Particles introduced by adventitious contamination are advantageously removed as the polymerization charge is transferred to the polymerization vessel. Removal of particles larger than a size within the range 0.2 to 1 micrometer is conveniently done at this stage. Filtration or centrifugation can remove particles. Filtration is preferred because of its convenience.

It has now been found desirable to minimize exposure of the polymer in the center of the fiber ("core polymer") to any circumstance or condition which will lead to degradation of the polymer as by heat or shear stress, formation of bubbles, or introduction of any solid particulate matter. Accordingly, polymerization and extrusion procedures have been designed to minimize both exposure of the polymer to adverse conditions, and contact of the polymer with any other material or surface, during the remaining manipulative steps. To this end, ram extrusion of a solid block of polymer is employed for extrusion of the core of the fiber, because use of a screw extruder, which entails extensive contact of the polymer with metal surfaces, can lead to contamination by foreign particles, extensive heating, shear stress, with possible degradation of polymer, and introduction of bubbles. Therefore, according to the present invention, the polymer is prepared in the shape of a preform suitable for the barrel of the ram extruder to be used in making the core of the optical fiber.

Use as Optical Fiber, Optical Switch

The optically responsive element of this invention is characterized in that it comprises one or more transparent, paramagnetic elements that are responsive to a magnetic field and a means for providing magnetic field. Preferably the means for providing the magnetic field is controllable and the optically responsive element further comprises a means for controlling the magnetic field. Illustrative preferred applications of the optically responsive transparent, paramagnetic elements include optical isolators, optical circulators, optical switches, and optical attenuators.

Preferably, the transparent, paramagnetic element is an element comprising in part or in whole a transparent, paramagnetic polymer composition as described above. Particularly, the transparent, paramagnetic polymer composition comprises a polymer complexed with a sufficient amount of one or more rare earth ions to provide a polymer composition magnetic mass susceptibility of greater than $20 \times 10^{-6}$ (more preferably greater than $25 \times 10^{-6}$, more preferably greater than $35 \times 10^{-6}$, more preferably greater than $50 \times 10^{-6}$) emu/g measured at 298° K. Preferably, the rare earth ions are selected from the group consisting of elements 64–69 (more preferably element numbers 66–67; most preferably, 66). Preferably, the polymer is a non-ethylene-containing polymer. Preferably, the non-ethylene-containing polymers are methylmethacrylate/methacrylic acid copolymers. Preferably, the ethylene-containing polymers are ethylene/acrylic acid copolymers.

Preferably, the amount of rare earth ions is greater than about 9 wt. % based on the total weight of the polymer composition. Particularly preferred rare earth ions are dysprosium and holmium, which can be used at lower levels than others in the series can be. Thus, when using elements 66 and/or 67, they are preferably present in an amount that is at least 5 wt. % based on the total weight of the polymer composition.

Preferably, at least one transparent, paramagnetic element is in the form of an optical fiber. An optical fiber comprising a transparent paramagnetic polymer in the light carrying portion is preferred. The invention thus provides a transparent, paramagnetic polymer composition optical fiber or waveguide that has a magnetic mass susceptibility of greater than $20 \times 10^{-6}$ (preferably greater than $25 \times 10^{-6}$) emu/g measured at 298° K and its use in an optically responsive element or devise. The optical fiber or waveguide preferably comprise one or more of the transparent, paramagnetic polymer compositions discussed above.

An optical switch having a plurality of transparent, paramagnetic, polymeric optical fibers is also preferred. Preferably, the optical switch has a plurality of transparent, paramagnetic, polymeric elements that are capable of response from a magnetic field such as one provided by a driver magnet.

The transparent, paramagnetic element that is responsive to the magnetic field preferably is "physically responsive" to the magnetic field. As used herein, an element is "physically responsive" to the magnetic field if the magnetic field directly or indirectly causes a physical movement of the element.

In another embodiment, the transparent, paramagnetic element that is responsive to the magnetic field is preferably "passively responsive" to the magnetic field. As used herein, an element is "passively responsive" to the magnetic field if the magnetic field does not cause a physical movement of the element. Instead, as used herein, "passively responsive" to a magnetic field comprises an alteration (or change) of the electromagnetic waves (e.g., source electromagnetic waves) transmitted through the paramagnetic element.

A preferred example of a passive response to a magnetic field comprises a Faraday rotation. Thus, a transparent, polymeric paramagnetic element used as a Faraday rotator is a preferred application of a passively responsive, transparent, polymeric paramagnetic element.

The transparent, polymeric, paramagnetic element, particularly the passive, transparent, polymeric, paramagnetic element, has an electromagnetic radiation path of at least 0.5 centimeters (cm). More preferably, it would have an electromagnetic radiation path of at least 1 cm, and more preferably at least 3 cm, and even more preferably at least 10 cm. Generally, the transparent, polymeric, paramagnetic element, particularly the passive, transparent, polymeric, paramagnetic element, has an electromagnetic radiation path of at most 20 meters (m), more preferably at most 10 m, and still more preferably at most 3 m.

The optically responsive element of this invention preferably comprises a passive, transparent, paramagnetic, polymeric element, more preferably a passive, transparent, organic polymeric, paramagnetic element, even more preferably a passive, transparent, organic-ionomeric polymeric, paramagnetic element, and still more preferably a passive, transparent, amorphous-organic-ionomeric polymeric, paramagnetic element. In each of these cases, the passive, transparent, polymeric paramagnetic element preferably comprises an optical fiber. An optical fiber having the passive, transparent, paramagnetic element as primary electromagnetic carrying element is a particularly preferred non-limiting illustrative example. An optical fiber having a light carrying portion comprising a transparent, paramagnetic polymer in the light carrying portion thereof is preferred. An optical switch having a plurality of transparent, paramagnetic, polymeric optical fibers is preferred. An optical switch having a plurality of transparent paramagnetic polymeric elements that are capable of response from a driver magnet is preferred.

The means for providing magnetic field is preferably being a driver magnet comprising a permanent magnet or an electromagnet. Preferably, the driver magnet has a controllable magnetic field. A driver magnet with a magnetic field that is focused is even more preferred. A preferred driver magnet is a permanent rare earth magnet, more preferably a NdFeB permanent magnet.

Preferably, the magnetic energy product (field strength) of the driver magnet is at least 300 gauss. A field strength of at least 500 gauss is more preferred, of at least 800 gauss is even more preferred, and of at least 1200 gauss is even more particularly preferred. A driver magnet having a magnetic field of at most 6000 gauss is generally currently preferred but higher magnetic fields can also be used.

The means for controlling the magnetic field in an optical element, particularly an optical switch, is a controller subsystem comprising an operative sensor, a processor, and a controller and associated operative connections therebetween is preferred. A preferred processor is a computer. A controller that can control (or change) the "passively responsive" or "physically responsive" element is preferred. As a non-limiting illustrative example, the controller brings about a change in the magnetic field of a controllable driver magnet that is responsive to a change in electric current by changing electric current. In another example, the controller brings about a change in the magnetic field effect on the element by changing the distance of the source of magnetic field from the element. Methods to change the magnetic field by changing current or distance are generally known in the art.

In the case of a "physically responsive" element, the controller can change a magnetic field that, in turn, changes position of the element. In the case of a "passively responsive" element, the controller can change a magnetic field that, in turn, for example, changes the amount of Faraday Rotation.

The invention herein provides for a variety of configurations of non-mechanical (magnetic) optical switches. For example, in one configuration shown in FIGS. 1A and 1B, a solid article of transparent, paramagnetic polymer 18 is used as an optical switch. In another configuration shown in FIGS. 2A and 2B, input and output fibers are depicted with a cladding over optical fiber. By including paramagnetic polymer in the core, the cladding, or both, the clad fiber itself can perform as the switch.

Figure 1B:
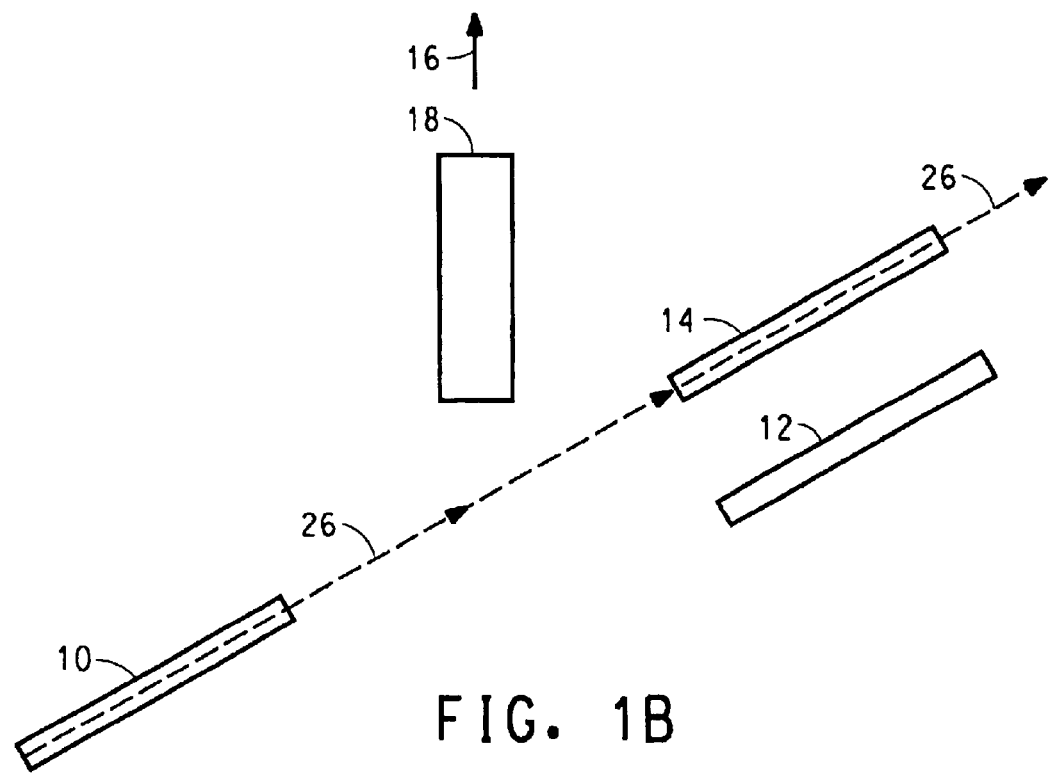

In FIG. 1A, the solid article 18 is positioned so that the light signal exiting input fiber 10 travels through article 18 and is bent (refracted) from its initial direction so as to travel along path 28 to a first output fiber 12. In FIG. 1B, a electromagnet, for example, can be energized to create a magnetic field 16, which in turn will cause the solid article of transparent, paramagnetic polymer 18 to move to a position not intersecting the light path. As such, the light signal exiting input fiber 10 passes directly (without refraction) along path 26 to a second output fiber 14.

The type of configuration shown in FIGS. 1A and 1B can be used for more than a single input and dual outputs, and thus could be used where multiplexing is needed. Certainly, in the configuration described, a single input signal could be directed in multiple directions in three-dimensional space depending on where the corresponding magnets were placed and their relative magnetic strengths.

Figure 2A:
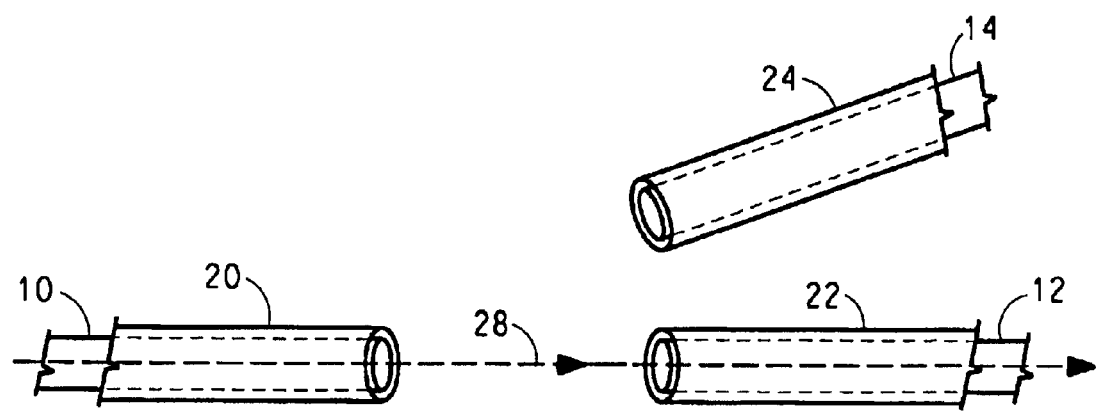
FIGS. 2A and 2B provide schematic views an optical fiber having at least part made from transparent, paramagnetic polymer and an embodiment of an optical switch where a magnetic field moves the fiber to redirect light from one path to another.
Figure 2B:
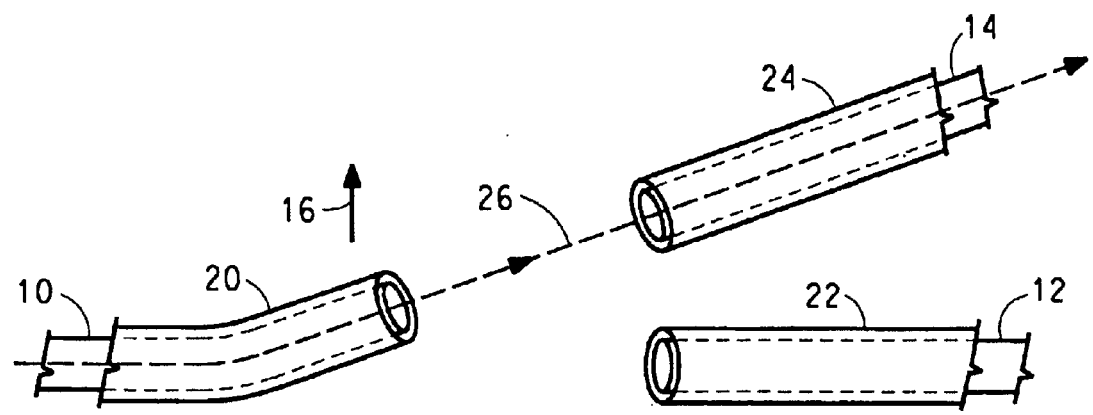

FIGS. 2A and 2B depict another embodiment of an optical switch according to the invention herein, showing an input optical fiber (core 10 clad with cladding 20) and two output optical fibers (first being core 12 clad with cladding 22 and second being core 14 clad with cladding 24). For such optical fibers as shown in FIGS. 2A and 2B, the refractive index of the core should be greater than that of the cladding. Either the core or cladding or both on at least one of the optical fibers should contain the paramagnetic polymer compositions outlined in this invention.

In FIGS. 2A and 2B, the either the core 10 or cladding 20 or both of input optical fiber contains the paramagnetic polymer of this invention so that it is movable by application of magnetic field. As can be seen, in the absence of a magnetic field as shown in FIG. 2A, light exits input optical fiber (core 10 clad with cladding 20) along path 28 through first output optical fiber (core 12 clad with cladding 22). By applying a magnetic field 16 as shown in FIG. 2B, the input optical fiber is moved. As a result, the light signal exiting input optical fiber (core 10 clad with cladding 20) is redirected so that the light signal is bent to travel along path 26 through second output optical fiber (core 14 clad with cladding 24).

In the configuration shown in FIGS. 2A and 2B, the first and second output optical fibers would not require inclusion of paramagnetic polymer because they are shown as not moving. But, by including the paramagnetic polymer composition of this invention in the cores (e.g., 12 and 14) and/or the cladding (e.g., 22 and 24) of all fibers entering and leaving the switch, a switch designer has extreme flexibility in how to design the device for multiplexing. Permanent magnet(s) can be placed at various locations within the optical switch, in three-dimensional space, in a manner that allows extensive variations in light routing. By associating a magnet with each fiber, it is possible to move the associated fiber by energizing the magnet associated with it. Thus, there could be multiple input and multiple output fibers in such a switch. That is to say that people skilled in the art can certainly envision other embodiments of an optical switch using transparent, paramagnetic polymers based on the principles disclosed herein.

Uses as Transparent Marker

The transparent, paramagnetic polymer as described herein would be useful for transparent marking, labeling or identification purposes, such as those used for product identification, product tracking and anti-theft applications. Such labeling would be unobtrusive and still be easily and quickly detectable by using known magnetic detectors.

By using the transparent, paramagnetic polymer described herein for labeling, it is possible to provide a label itself would be essentially invisible to the human eye. That is, the label would be free of optical detection by a person with 20/20 vision from a distance of 3 feet or more. Polymer transparency preferably is such that at least 55% (preferably at least 65%, more preferably at least 75%) of the incident light/radiation can be transmitted through an eighth (⅛) inch thick test piece of the label material for greater than 50% of the wavelengths in the range of 400 to 1800 nanometers (nm) as measured according to ASTM D1746-97.

Particular transparent, paramagnetic polymer compositions useful for such labeling applications comprise polymers complexed with a sufficient amounts of one or more rare earth ions to provide a polymer composition magnetic mass susceptibility of greater than $20 \times 10^{-6}$ (preferably greater than $25 \times 10^{-6}$, preferably greater than $35'10^{-6}$, preferably greater than $50 \times 10^{-6}$) emu/g measured at 298° K. Preferably, the rare earth ions are selected from the group consisting of elements 64–69 (more preferably element numbers 66–67; most preferably, 66). Preferably, the polymer is a non-ethylene-containing polymer. Preferably, the non-ethylene-containing polymers are methylmethacrylate/methacrylic acid copolymers. Preferably, the ethylene-containing polymers are ethylene/acrylic acid copolymers.

The transparent, paramagnetic polymer can be applied as a film, particle, fiber, or ink to the article being labeled by a bonding means such as by a thermal bond, covalent bond, and/or a polar bond. For labeling applications, the application of clear, paramagnetic particles as is done in ink jet printing is preferred. The label is preferably applied in a pattern, even more preferably as a bar code such as is conventionally used in many commercial applications today.

Transparent, paramagnetic labels on the surface of a labeled article are preferred. The transparent, paramagnetic label can be applied as a bonded film and/or composition. An adhesive bond is a preferred bonding mechanism. A thermal bond is a preferred bonding mechanism. A radiation-cured bond can be a preferred bonding mechanism. The film and/or composition can be pre-shaped before bonding to indicate certain coded information. The film and/or composition can be shaped to indicate certain preferred coded information after attachment by such methods as laser etching and/or mechanical shaping mechanisms (e.g. cutting, abrading, etc.). An example of coded information can be a bar code and/or a recognizable pattern. Various methods of printing (e.g. flexographic, screen, letterpress, gravure, and offset printing) can as also be used. Preferably, the method for labeling an article comprises the steps of (a) applying a label composition comprising a polymerization initiator and a monomer composition comprising polymerizable monomers particularly acrylic monomers, a source of one or more rare earth ions selected from the group consisting of elements 64–69 (more preferably element numbers 66–67; most preferably, 66) onto the article; and then (b) curing the label composition to form a transparent, paramagnetic polymer label.

Paramagnetic Polymers and Other Uses

Medical and Biological Uses

Magnetically responsive polymer may also be useful as polymer particles for use in separating biologically active materials and or assaying such materials. Such uses include, e.g., passive or covalent coupling of biological material such as antigens, antibodies, enzymes of DNA/RNA hybridization, use as solid phase for various types of immunoassays, DNA/RNA hybridization probes assay, affinity purification, cell separation and other medical, diagnostic and industrial applications.

A wide variety of magnetic particles may be/have been used as solid phase for various applications such as fluorescence immunoassays, radio immunoassays, enzyme immunoassays, cell separations, enzyme immobilizations and affinity purifications, among others. Some magnetic particles may be useful in one application, but not another. For example, the magnetic particles disclosed in U.S. Pat. Nos. 4,554,088 and 4,628,037, which comprise a superparamagnetic metal oxide core generally surrounded by a coat of polymeric silane, may be useful in immunoassay and affinity purification due to the large surface area and slower settling rate, but are not suitable in cell separation applications such as bone marrow purging. Due to the small size of the magnetic particles disclosed in these two patents, it is very difficult to remove all of the magnetic particles from the cell suspension effectively.

In similar fashion, paramagnetic polymer particles could be useful in many of the bio applications discussed above. For example, in cell separation, paramagnetic particles could be used to either remove unwanted cells (negative selection) or enrich the desired cells (positive selection) through immunological reactions or non-immunological reactions. This principle can be used to remove cancer cells from bone marrow (bone marrow purging), purify cell populations through either positive or negative selection for tissue culture and perform various cellular immunoassays etc.

In affinity purification, paramagnetic particles could be used in place of conventional solid phase (such as polyacrylamide gels, sepharose gels or other cellulose beads) to purify a wide variety of biological materials such as antibodies, antigen, enzymes, inhibitors, cofactors, single-stranded DNA, binding proteins, haptens and carbohydrates etc. In another application similar to affinity purification, paramagnetic particles could be used to cross-adsorb and remove unwanted protein components from the antisera or clinical samples. In enzyme immobilization the enzyme would be immoblized onto the paramagnetic particles through various means of coupling so as to preserve the enzyme activity and to permit the reuse of immobilized enzyme. The paramagnetic particles with immoblized enzyme could then be used to replace other solid phases such as glass beads, controlled pore glass, silica gels and cellulose beads, etc., which are commonly used in immobilized enzyme systems to produce a wide variety of materials such as carbohydrates, amino acids and proteins, etc.

For cell-separation applications, magnetic particles are coated with an antibody, e.g., sheep anti-mouse IgG for bone marrow purging, and the bone marrow is treated with a mixture of several monoclonal antibodies against the cancer cell surface antigens. The magnetic particles will bind only to the cancer cells and cause them to be separated from normal cells by passing them through a strong magnetic field. The cleansed cells are then put back into the patient. Similarly, a paramagnetic particle could be used.

Other potential cell-separation applications for paramagnetic particles include high gradient magnetic separation (HGMS). This is a procedure for selectively retaining magnetic materials in a chamber or column disposed in a magnetic field. In one application of this technique, a target material, typically a biological material, is labeled by attaching the target material to a magnetic particle. The attachment is generally through association of the target material with a specific binding partner that is conjugated to a coating on the particle that provides a functional group for the conjugation. The target material, thus coupled to a magnetic "label", is suspended in a fluid that is then applied to the chamber. In the presence of a magnetic gradient supplied across the chamber, the magnetically labeled target is retained in the chamber; if the chamber contains a matrix, it becomes associated with the matrix. Materials that do not have magnetic labels pass through the chamber. The matrix is often a material of suitable magnetic susceptibility to induce a high magnetic field gradient locally in the chamber in volumes close to the surface of the matrix. This permits the retention of fairly weakly magnetized particles.

Paramagnetic particles could also be useful as imaging agents for magnetic resonance imaging (MRI) procedures.

It's foreseeable that the paramagnetic particles of this invention could be used for industrial applications, also, like treatment of industrial waste to remove harmful chemicals, e.g., organic or inorganic solvents from industrial material. The ease of separation, fast reaction rate and large surface area of the paramagnetic particles described herein would facilitate these applications.

Paramagnetic particles useful for the bio applications discussed above, may comprise the transparent, paramagnetic polymer disclosed herein, as well as compositions comprising ethylene-acrylic acid copolymer-based ionomers comprising rare earth salts. The paramagnetic particles preferably are made from polymers that do not have residual rare earth compounds in them after the rare earth ions are complexed with the polymers. That is to say, there is sufficient acid functionality in the polymer to complex all of the rare earth ions. These paramagnetic particles can be optimized in terms of size, surface area, rare earth ionomer content and surface characteristics for a wide variety of biomedical applications, as discussed above. Primarily the particle would fall in the size range of about 0.5–1000 micron ($\mu$m), and have the appropriate surface characteristics, i.e., coated, etc.

Magnetic particles can be used for passive coupling of biological materials can be preferred for some applications. Magnetic particles can be preferred for polar coupling of biological materials for other applications. Magnetic particles can be preferred for covalent coupling of biological materials for still other applications. Magnetic particles that are optically active are preferred. Preferred optically active particles are capable of fluorescing. A preferred biological material consists of the materials selected from the group consisting of antigens, antibodies, and enzymes and DNA/RNA hybridization. Preferred enzymes and RNA/DNA hybridization include applications consisting of immunoassays, affinity purification, cell separation, and other medical, diagnostic, and industrial applications. The magnetic particles are preferably free of a magnetic coating. The magnetic particles preferably comprise a clear paramagnetic polymeric composition having at least one polar functional group, rare earth element functionally bound to the polar paramagnetic polar composition, and at one polar functional group which is not bound to a rare earth element. Use of a chemilumescent optical clear particle is also preferred.

Use of paramagnetic particles having a polymeric core particle coated with a magnetically responsive metal oxide is known for use with biological materials and applications. Magnetic separation as illustrated by a continuous flow magnetic separator for classification and/or separation are known. Magnetic particles, their use, and separation of biological materials are generally known and U.S. Pat. Nos. 4,935,147, 4,941,969, 5,935,866, 5,536,644, 5,279,936, 6,133,043, 5,283,079, 5,798,083, 5,744,367, and 6,013,531 are included in their entirety for further general guidance by those skilled in the arts.

Use as Living Hinge

Another potential use for the transparent, paramagnetic polymer disclosed herein is a unitary hinged element which can be moved with a magnetic driver, sometimes referred to as a living hinged element. Such a living hinged element could be used for a flapper valve to control fluid flows, such as a liquid or gas. A living hinged element that changes the direction of the propagation of electromagnetic radiation is also envisioned. Use of living hinges with a magnetically responsive element as illustrated by a ferromagnetic flapper valves are known for controlling fluid flow and U.S. Pat. No. 3,982,554 is included in its entirety for further general guidance.

EXAMPLES

Examples 1–7 and Comparative Example A

The following examples demonstrate the effectiveness of producing polymers that contain rare earth salts. Examples 1–3 were all based on ethylene-methacrylic acid random copolymers, which were neutralized using dysprosium triacetylacetonate hydrate (DyAcAc) using the following procedure.

A 2-roll-mill was heated to 55° C. and ethylene/19 wt. % methacrylic acid copolymer (Nucrel® Rx-86) was placed on the rolls along with Irganox 1010 antioxidant. The DyAcAc was then slowly added to the material and the two components were mixed for 3 minutes. The blended material was then removed from the roll-mill and allowed to cool to room temperature. The blended material was then placed in a 4×6×⅛ inch mold and compression molded at 160° C. for 8 minutes. This final step allowed the reaction to be completed forming the rare earth salt, and the material was then cooled to room temperature and removed from the mold. Table 2 outlines the materials used to prepare the examples.

TABLE 2

| Materials for Paramagnetic Ethylene Acid Copolymers | | | |
|---|---|---|---|
| Examples | 1 | 2 | 3 |
| Ethylene/19 wt. % MAA random copolymer | 50.0 g | 35.0 g | 20.0 g |
| DyAcAc | 7.15 g | 10.0 g | 10.0 g |
| Irganox 1010 | 0.06 g | 0.06 g | 0.06 g |

Example 4 is based on a system of methacrylic acid monomer neutralized using dysprosium triacetylacetonate hydrate that then was polymerized with methyl methacrylate monomer and cast into an acrylic sheet using the following procedure.

Methacrylic acid and a short chain fatty acid (e.g. oleic acid) were mixed in a glass reaction vessel at 140° C. along with DyAcAc for 45 minutes. The temperature was then reduced to 60° C. and methyl methacrylate monomer was added. The mixture was then stirred for an additional 15 minutes at which time the resulting composition was cooled to room temperature. The final step involved mixing Lupersol® 11 initiator into the mixture. The composition with initiator was then poured into a mold comprised of two glass plates placed face to face sealed with a rubber gasket. The filled mold was then placed in a vacuum oven with nitrogen purge for 1 hour at 30° C., followed by 5 hours at 80° C., followed by 1 hour at 120° C. After the 7 hour synthesis was complete, the material was cooled to room temperature and removed from the mold.

Examples 5, 6 and 7 were prepared by heating methyl methacrylate, oleic acid, and methacrylic acid to 90° C. while stirring in a round bottomed glass flask. Dysprosium acetate was then added and the composition was mixed until the solution became clear. The solution was then cooled to 50° C. and Lupersol® 11 initiator was added. The composition with initiator was then transferred to a glass mold and the polymerization was carried out as described in Example 4. Also, the visible transparency of the material of Example 5 was found to improve by subjecting a 4 inch×4 inch piece of it to 30,000 pounds force at 150° C. for 20 minutes.

Table 3 outlines the materials used to prepare the examples. In addition, the initial amount of $Dy^{3+}$ ion contained in each sample was calculated as a weight percent based on the total weight of the reactants and is presented in Table 3. The following molecular weights for the Dy-containing compounds were used: 459.83 g/mol for DyAcAc, 339.64 g/mol for Dy acetate, and 162.5 g/mol for $Dy^{3+}$.

For Example 4, the initial weight percent of $Dy^{3+}$ was calculated as [(162.5/459.83) 20.0 g]/[8.0 g+8.0 g+20.0 g+40.0 g]=9.3 wt. %. And for Example 5, it was calculated as [(162.5/339.64) 15.0 g]/[15.0 g+10.0 g+15.0 g+50.0 g]=8.0 wt. %. For Example 6, it was calculated as [(162.51339.64) 12.5 g]/[9.1 g+10.0 g+12.5 g+52.4 g]=7.1 wt. %. For Example 7, it was calculated as [(162.5/339.64) 21.25 g]/[12.53 g+13.73 g+21.25 g+50.80 g]=10.3 wt. %.

The final weight percent of $Dy^{3+}$ ion is based on the final polymer composition and was calculated by assuming all by-products were removed. For Example 4, the calculation is as follows [(162.5/459.83) 20.0 g]/[8.0 g+8.0 g+7.1 g+40.0 g]=11.2 wt. %. For Example 5, the calculation is [(162.5/339.64) 15.0 g]/[15.0 g+10.0 g+7.1 g+50.0 g]=8.7 wt. %. For Example 6, the calculation is as follows [(162.5/339.64) 12.5 g]/[9.1 g+10.0 g+5.98 g+52.4 g]=7.7 wt. %. For Example 7, the calculation is [(162.5/339.64) 21.25 g]/[12.53 g+13.73 g+10.17 g+50.80 g]=11.6 wt. %. As can be seen in Table 3, the calculated final (estimated) $Dy^{3+}$ wt. % and the final $Dy^{3+}$ wt. % measured by X-ray Fluorescence Spectroscopy for Example 7 correlate well.

TABLE 3

Materials for Paramagnetic Acrylic Polymers

| Example | 4 | 5 | 6 | 7 |
|---|---|---|---|---|
| Methacrylic acid | 8.0 g | 15.0 g | 9.1 g | 12.53 g |
| Oleic acid | 8.0 g | 10.0 g | 10.0 g | 13.73 g |
| Dysprosium acetate | — | 15.0 g | 12.5 g | 21.25 g |
| DyAcAc | 20.0 g | — | — | — |
| Methyl methacrylate | 40.0 g | 50.0 g | 52.4 g | 50.8 g |
| Lupersol ® 11 | 0.08 g | 0.075 g | 0.07 g | 0.30 g |
| Calc. $Dy^{3+}$ wt. % (initial) | 9.3 wt. % | 8.0 wt. % | 7.1 wt. % | 10.3 wt. % |
| Calc. $Dy^{3+}$ wt. % (final) | 11.2 wt. % | 8.7 wt. % | 7.7 wt. % | 11.6 wt. % |
| Measured Final $Dy^{3+}$ wt. % | No Data | No Data | No Data | 11.5 wt. % |

The materials synthesized were then subjected to both quantitative and qualitative measurements for magnetic susceptibility and transparency. Table 4 outlines the quantitative measurements made on the samples comparing magnetic susceptibility and transmission of 1550 nm light to that of Comparative Example A which is an ethylene methacrylic acid (10 wt % methacrylic acid) copolymer neutralized with the transition metal zinc (68% neutralized).

TABLE 4

Properties of Paramagnetic Materials

| Example | Transmission of 1550 nm Light through ⅛ inches | Magnetic Susceptibility (emu/g) |
|---|---|---|
| 1 | 75.0% | No data |
| 2 | 59.2% | 25.7 × $10^{-6}$ @ 298° K. |
| 3 | No Data | No Data |
| 4 | No Data | No Data |
| 5 | No Data | No Data |
| 6 | 77.0% | 25.0 × $10^{-6}$ @ 298° K. |
| 7 | 78.5% | 30.4 × $10^{-6}$ @ 298° K. |
| Comp. Ex. A | 77.1% | 0 |

In addition, qualitative tests of magnetic susceptibility were performed using a 1.25×1.75×0.25 inch NdFeB magnet. This magnet was used to attempt to physically move the materials in various environments. Table 5 presents the results.

As noted, all of the 2×2×2 mm ethylene copolymer cubes that contained the Dy salt could be moved by the magnetic field when placed in a glass vial filled with de-ionized water. As a comparison, no movement was recorded when a 2×2×2 mm cube of Comparative Example A material was placed in a glass vial of de-ionized water. In addition, a 10 cm diameter disk containing a 3 cm diameter hole in the center made from the material of Example 2 could be moved by the NdFeB magnet in air when the disk was suspended or balanced by a rod or string through the disk's center.

Neither the ethylene copolymer system with the lowest rare earth content (Example 1) nor the system neutralized with the zinc (Comp. Ex. A) could be picked-up off a horizontal surface, overcoming the force of gravity, using the magnet described above. Conversely, both of the other two ethylene copolymer samples (Examples 2 and 3) and the acrylic polymer samples (Examples 4 and 5) could be picked-up from a horizontal surface when the NdFeB magnet was placed 1 to 2 mm above the sample.

TABLE 5

Qualitative Tests of Magnetic Susceptibility

| Example | 2 × 2 × 2 mm cubes moved within water-filled vial by NdFeB magnet outside vial | 2 × 2 × 2 mm cubes picked-up from horizontal surface in air by NdFeB magnet 1 mm away |
|---|---|---|
| 1 | Yes | No |
| 2 | Yes | Yes |
| 3 | Yes | Yes |
| 4 | Yes | Yes |
| 5 | Yes | Yes |
| 6 & 7 | No Data | No Data |
| Comp. Ex. A | No | No |

A material having a positive magnetic susceptibility is known to exhibit Faraday Rotation. This rotation refers to the rotation of plane polarized light as it passes through the paramagnetic material in the presence of a magnetic field. The angle of rotation (θ) is given by the equation:

$$\theta = V(\lambda) \cdot B \cdot L$$

where V is the Verdet constant and is a function of the wavelength (λ) of light passing through the material, B is the magnetic field strength, and L is the path length of the light through the material. Table 6 outlines Verdet constants for Examples 6 and 7.

TABLE 6

Verdet Constants at 680 nm and 1550 nm

| Example | Verdet @ 680 nm | Verdet @ 1550 nm |
|---------|-----------------|------------------|
| 6 | −28 rad/T m | −16 rad/T m |
| 7 | −23 rad/T m | −16 rad/T m |

Example 8

Figure 3:
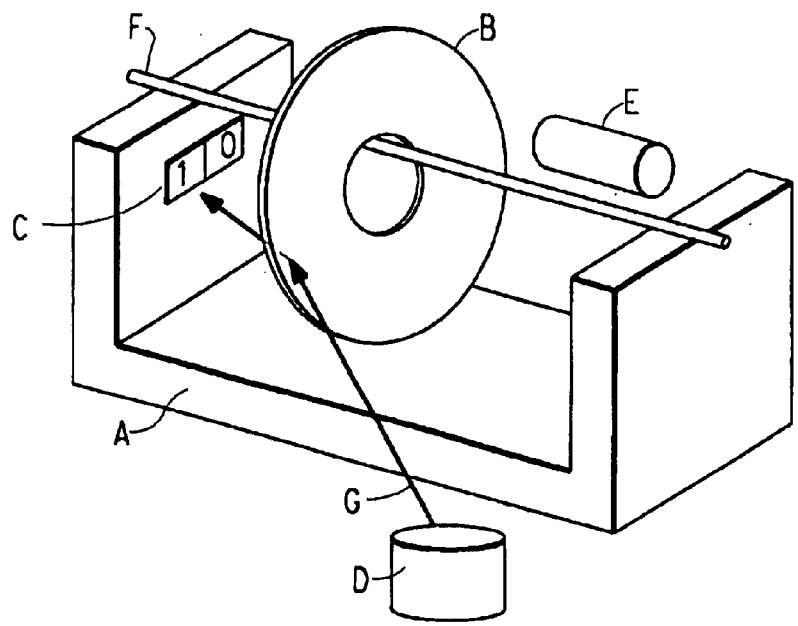
FIGS. 3, 4, 5A and 5B depict various views of an apparatus (used in Example 8) designed to direct the path of a laser light by manipulating a transparent, paramagnetic polymer disk using a magnetic field.
Figure 4:
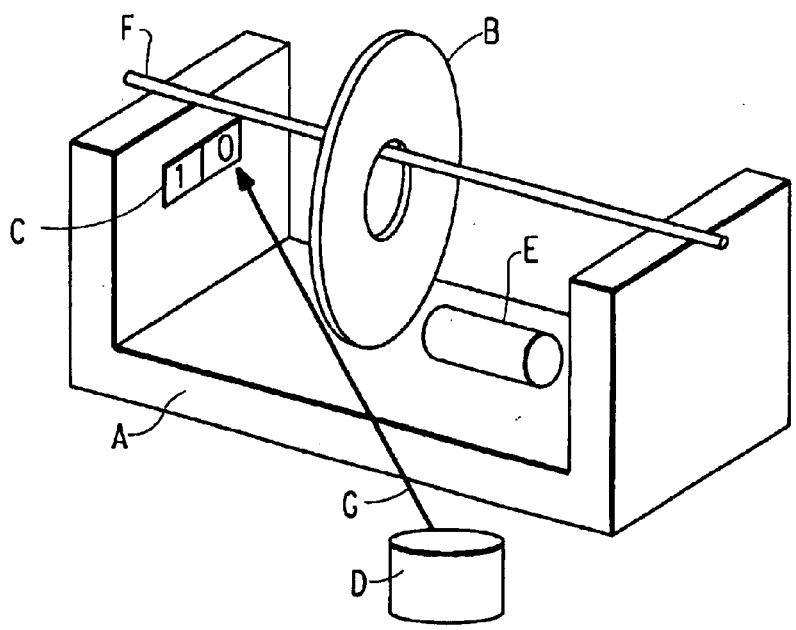

FIGS. 3–5 depict an apparatus designed to direct the path of laser light by manipulating a transparent polymer disk using a magnetic field. The transparent polymer disk (3⅞ inches in diameter with 1⅛ inch diameter hole in center) was machined from a 4×6×⅛ inch plaque of the material of Example 2. This demonstrates the suitability of optically clear, paramagnetic polymer for use in one type of non-mechanical, optical switch. The magnetic field in this case is produced from a permanent magnet (a NdFeB magnet 1.5×1.5×⅜ inches).

By placing the magnet in the position shown in FIG. 3, the disk (B) is rotated on the support rod (F) so that the disk face is parallel with the face of the support block (A) on which is attached light path indicator label (C) depicting two positions—"1" position and "0" position. In this orientation of the disk (B), the laser light (650 nm wavelength) produced by fixed point source (D) travels along light path (G) which is bent as it passes through disk (B) resulting in the beam of light exiting the back side of the transparent disk and striking the indicator label (C) at the "1" position.

FIG. 4 shows how the switch is moved so that the light from light source (D) travels along light path (G) to strike indicator label (C) at the "0" position. The switch is placed in this configuration by moving the magnet to the other side of the paramagnetic disk (B), causing the disk to rotate on the support rod (F). In this position the laser light does not pass through the disk (B) and therefore travels in a straight path (G) striking the indicator label (C) at the "0" position.

Figure 5A:
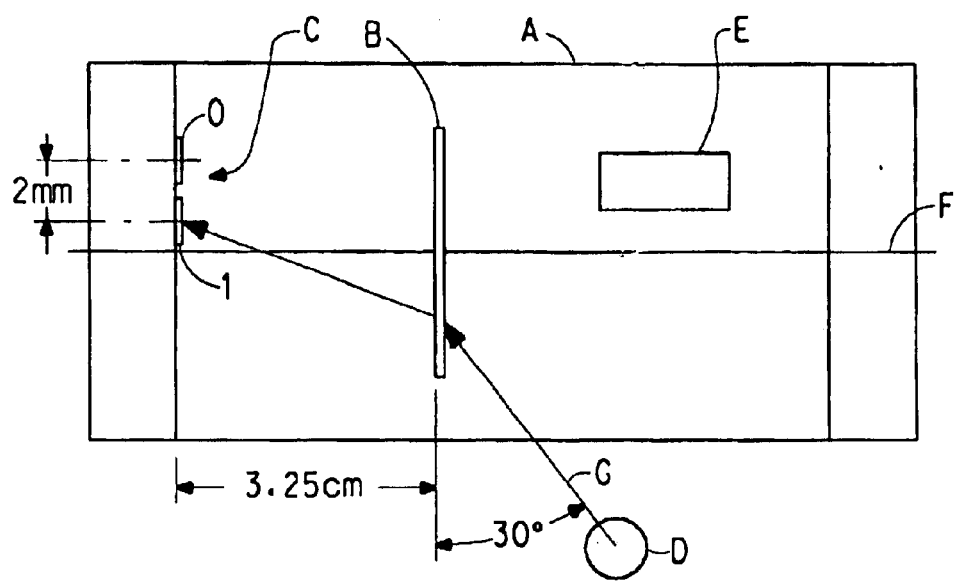
Figure 5B:
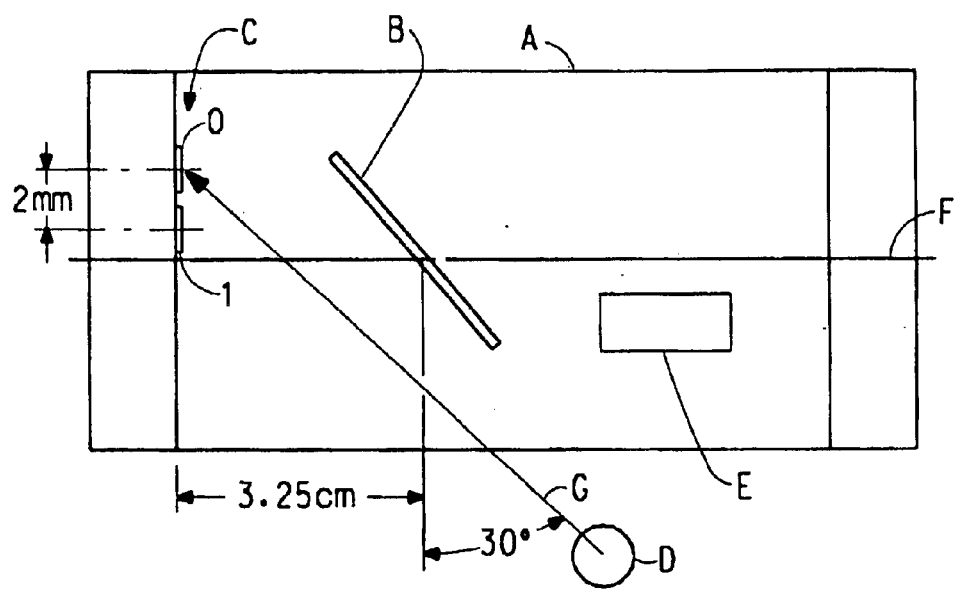

Finally, FIGS. 5A and 5B present a plan view of the apparatus indicating the pertinent distances and angles between the disk, the laser source, and indicator label. FIG. 5A corresponds to FIG. 3 and FIG. 5B corresponds to FIG. 4.

Figure Legend for FIGS. 3, 4 and 5

A—Support Block
B—Transparent Paramagnetic Polymer
C—Indicator Label
D—Laser Light Source
E—Permanent Magnet (Source of applied magnetic field)
F—Support Rod
G—Light Path

Examples 9–17

Examples 9 through 17 were created by heating 12.92 g methyl methacrylate, 3.49 g oleic acid, and 3.18 g methacrylic acid to 90° C. while stirring in a round bottomed glass flask. 5.40 g of Dysprosium acetate (weight based on material that had been dried for 48 hrs in a 130° vacuum oven) was added. This composition was then mixed until the solution became clear. The solution was then cooled to 50° C. and 0.15 g of Lupersol® 11 (t-Butyl Peroxypivalate) initiator was added. This formulation was then coated onto 9 separate pieces of 25% cotton linen-business stationary (Boise Cascade #BB-2410LN) that had been dried for 2 hours in a vacuum oven set at 60° C. and cut into 1 cm by 28 cm paper strips.

The monomer plus initiator syrup was applied to the 1 cm by 28 cm paper strips by squirting the syrup out of a glass pipette tip onto a 1 cm by 1 cm square at one end of each paper strip. The remaining uncoated 27 cm of the paper strip was masked by a glass plate. Each strip was placed on top of a single sheet of an absorbing napkin to prevent excess material from wicking beyond the unmasked 1 cm by 1 cm area. Excess monomer syrup from the 1 cm by 1 cm marked area was pushed away from the paper strip by quickly moving a glass plate over the surface of the 1 cm by 1 cm area.

Once the monomer composition was applied to the 1 square cm area on the 1 cm by 28 cm paper strip, the paper strip was placed in a oven at 80° C. for 2 hours. After the paper was removed from the oven, the paper with marked area was weighed. The weights of the paper strips before and after coating are recorded in Table 7.

Figure 6:
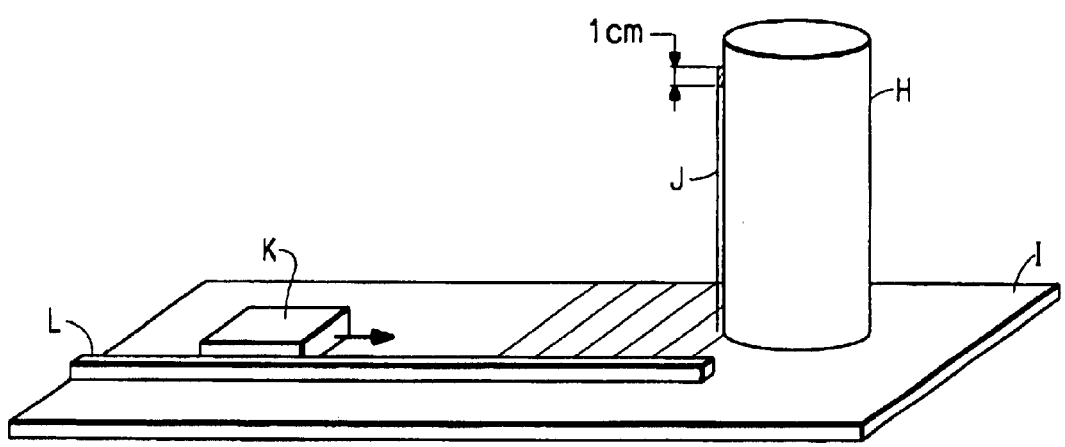
FIG. 6 depicts an apparatus (used in Examples 9–17) designed to demonstrate the effectiveness of transparent, paramagnetic material applied to strips of paper hung from post perpendicular to surface along which a magnet is moved.

These strips of paper were then cut to varying lengths and their response to a magnetic field was measured. This measurement involved slowly moving a rare earth permanent magnet toward the marked end of the strip after each strip had been placed in an apparatus that allowed it to hang freely. FIG. 6 depicts the apparatus used in these examples. The apparatus consisted of a 6 cm diameter Plexiglas tube (H) that was placed squarely on a hard surface (I). The paper strips (J) were mounted to the outside of this tube by taping the top 1 cm by 1 cm end of the paper strip so that the bottom "marked" end of the strip was hanging against the tube and less than 1 mm from touching the hard surface. The ability of the paper strip to swing freely away from the Plexiglas tube was demonstrated for each mounted strip by blowing air behind the paper strip through a small hole in the tube and observing the free movement of the paper. A 1.5 by 1.5 by ⅜ inch NeFeB magnet (K) was moved along the hard surface by slowly pushing the magnet along a guide rail (L). This guide rail allowed one of the 1.5 by ⅜ inch faces of the magnet to approach the paper strip while maintaining the orientation of this face of the magnet parallel to the 1 cm by 1 cm marked area of the paper strip. The guide rail was marked in increments of millimeters and the magnet was pushed toward the marked paper strip starting from a position 15 mm away from the tube. As the magnet moved towards the paper strip, the paper strip was observed for any indication that the sample would move away from the tube towards the magnet face. At the moment the paper was able to be attracted by the magnet and touch the magnet face, the distance between the magnet face and the tube support was recorded. The resulting measurements are given in Table 7.

TABLE 7

| Ex. | Weight of paper strip + acrylic (g) | Weight of paper strip (1 cm × 28 cm) | Weight of acrylic composition (g/cm²) | Total Length of Cut Paper Strip (cm) | Proximity of Magnet to Tube when Strip Moves |
|-----|------|------|------|----|---------------------|
| 9   | 0.257 | 0.255 | 0.002 | 28 | 3 mm |
| 10  | 0.254 | 0.253 | 0.001 | 28 | 2 mm |
| 11  | 0.254 | 0.252 | 0.002 | 28 | 3 mm |
| 12  | 0.267 | 0.265 | 0.002 | 15 | 3 mm |
| 13  | 0.247 | 0.244 | 0.003 | 15 | 2 mm |
| 14  | 0.253 | 0.250 | 0.003 | 15 | 3 mm |
| 15  | 0.260 | 0.258 | 0.002 | 8  | No movement at 1 mm |

TABLE 7-continued

| Ex. | Weight of paper strip + acrylic (g) | Weight of paper strip (1 cm × 28 cm) | Weight of acrylic composition (g/cm$^2$) | Total Length of Cut Paper Strip (cm) | Proximity of Magnet to Tube when Strip Moves |
|---|---|---|---|---|---|
| 16 | 0.262 | 0.257 | 0.005 | 8 | No movement at 1 mm |
| 17 | 0.246 | 0.244 | 0.002 | 8 | No movement at 1 mm |

What is claimed is:

1. A transparent, paramagnetic polymer composition comprising a non-ethylene containing polymer complexed with a sufficient amount of one or more rare earth ions selected from the group consisting of elements 64–69 to provide a polymer composition magnetic mass susceptibility of greater than 20×10$^{-6}$ emu/g measured at 298° K.

2. The transparent, paramagnetic polymer composition of claim 1 wherein the non-ethylene containing polymer is a fluoropolymer with sulfonic or carboxylic acid functionality.

3. The transparent, paramagnetic polymer composition of claim 1 wherein the non-ethylene containing polymer is an acrylic polymer formed from the polymerization of at least one acrylate or acrylic acid.

4. The transparent, paramagnetic polymer composition of claim 3 wherein the transparent, paramagnetic polymer composition additionally comprises a short-chain fatty acid of the formula $R_1$COOH wherein $R_1$ is selected from the group consisting of $C_5$–$C_{30}$.

5. The transparent, paramagnetic polymer composition of claim 3 wherein the acrylate is methyl methacrylate and the acrylic acid is methacrylic acid.

6. The transparent, paramagnetic polymer composition of claim 4 wherein the acrylate is methyl methacrylate, the acrylic acid is methacrylic acid, and the short chain fatty acid is oleic acid.

7. A transparent, paramagnetic polymer composition comprising a non-ethylene containing polymer complexed with one or more rare earth ions selected from the group consisting of elements 64–69, the amount of rare earth ions being greater than 9 weight percent based on the total weight of the transparent, paramagnetic polymer.

8. The transparent, paramagnetic polymer composition of claim 7 wherein the non-ethylene containing polymer is a fluoropolymer with sulfonic or carboxylic acid functionality.

9. The transparent, paramagnetic polymer composition of claim 7 wherein the non-ethylene containing polymer is an acrylic polymer formed from the polymerization of at least one acrylate or acrylic acid.

10. The transparent, paramagnetic polymer composition of claim 9 wherein the transparent, paramagnetic polymer composition additionally comprises a short-chain fatty acid of the formula $R_1$COOH wherein $R_1$ is selected from the group consisting of $C_5$–$C_{30}$.

11. The transparent, paramagnetic polymer composition of claim 9 wherein the acrylate is methyl methacrylate and the acrylic acid is methacrylic acid.

12. The transparent, paramagnetic polymer composition of claim 10 wherein the acrylate is methyl methacrylate, the acrylic acid is methacrylic acid, and the short chain fatty acid is oleic acid.

13. A transparent, paramagnetic polymer composition comprising a non-ethylene containing polymer complexed with one or more rare earth ions selected from the group consisting of elements 66–67, the amount of rare earth ions being greater than 5 weight percent based on the total weight of the transparent, paramagnetic polymer.

14. The transparent, paramagnetic polymer composition of claim 13 wherein the non-ethylene containing polymer is a fluoropolymer with sulfonic or carboxylic acid functionality.

15. The transparent, paramagnetic polymer composition of claim 13 wherein the non-ethylene containing polymer is an acrylic polymer formed from the polymerization of at least one acrylate or acrylic acid.

16. The transparent, paramagnetic polymer composition of claim 15 wherein the transparent, paramagnetic polymer composition additionally comprises a short-chain fatty acid of the formula $R_1$COOH wherein $R_1$ is selected from the group consisting of $C_5$–$C_{30}$.

17. The transparent, paramagnetic polymer composition of claim 15 wherein the acrylate is methyl methacrylate and the acrylic acid is methacrylic acid.

18. The transparent, paramagnetic polymer composition of claim 16 wherein the acrylate is methyl methacrylate, the acrylic acid is methacrylic acid, and the short chain fatty acid is oleic acid.

\* \* \* \* \*